(12) United States Patent
Carrie

(10) Patent No.: US 7,660,894 B1
(45) Date of Patent: Feb. 9, 2010

(54) CONNECTION PACER AND METHOD FOR PERFORMING CONNECTION PACING IN A NETWORK OF SERVERS AND CLIENTS USING FIFO BUFFERS

(75) Inventor: Susan E Carrie, Mountain View, CA (US)

(73) Assignee: Extreme Networks, Santa Clara, CA (US)

( * ) Notice: Subject to any disclaimer, the term of this patent is extended or adjusted under 35 U.S.C. 154(b) by 968 days.

(21) Appl. No.: 10/412,812

(22) Filed: Apr. 10, 2003

(51) Int. Cl.
*G06F 15/173* (2006.01)

(52) U.S. Cl. .................................................. 709/225
(58) Field of Classification Search ................ 709/201, 709/225, 229, 203
See application file for complete search history.

(56) References Cited

U.S. PATENT DOCUMENTS

| | | | | |
|---|---|---|---|---|
| 6,023,722 | A * | 2/2000 | Colyer | 709/201 |
| 6,081,507 | A * | 6/2000 | Chao et al. | 370/235 |
| 6,252,880 | B1 * | 6/2001 | Hanna et al. | 370/425 |
| 6,847,648 | B1 * | 1/2005 | Hodgins et al. | 370/395.43 |
| 6,904,014 | B1 * | 6/2005 | Gai et al. | 370/230.1 |
| 7,321,926 | B1 * | 1/2008 | Zhang et al. | 709/220 |
| 2002/0055980 | A1 * | 5/2002 | Goddard | 709/217 |
| 2003/0061356 | A1 * | 3/2003 | Jason, Jr. | 709/227 |

* cited by examiner

*Primary Examiner*—Andrew Caldwell
*Assistant Examiner*—Bradford F Fritz
(74) *Attorney, Agent, or Firm*—Blakely Sokoloff Taylor & Zafman

(57) ABSTRACT

A connection pacer and method for performing connection pacing in a network of servers and clients using a first-in-first-out ("FIFO") buffer.

35 Claims, 16 Drawing Sheets

Network with Clients and Servers

Network with Clients and Servers

A First Embodiment of a Load Balancer

A Second Embodiment of a Load Balancer

A Third Embodiment of a Load Balancer

A First Embodiment Using a Single
Pacing Data FIFO Buffer

A Second Embodiment Using a Single
Pacing Data FIFO Buffer

An Embodiment Using Multiple Pacing
Data FIFO Buffers

An Embodiment Using Multiple Pacing Data
FIFO Buffers and Multiple Comparators

Performing Connection Pacing

Selecting a Server

Putting the Selected Server into a Pacing State

Determining a Removal Time

Determining the Server Pacing Period

Removing
the Server from Pacing State
(Single Comparator Implementation)

Removing
the Server from Pacing State
(Multiple Comparator
Implementation)

Removing the Server
from Pacing State

CONNECTION PACER AND METHOD FOR PERFORMING CONNECTION PACING IN A NETWORK OF SERVERS AND CLIENTS USING FIFO BUFFERS

BACKGROUND OF THE INVENTION

1. Field of the Invention

The present invention relates generally to communications over a network, and specifically, to establishing connections between clients and servers.

2. Description of Background Art

In the development of a large computing services site supporting an Internet, LAN or WAN based service, such as an e-commerce site or a telecommunications service site, scalability may be achieved by employing multiple servers to service a plurality of clients in a network. In large sites, a load balancer may receive client requests for connections and then redirect the requests to one of the servers that is best able to handle the request at the time the request is received. The clients for such a site may include, for example, a web browser or other application. The services provided may be e-mail services, delivery of web content or any other service which requires establishing a connection between the client and the server.

Establishing a new client connection to a server requires allocation of resources associated with that server. Each server supports the establishment of a finite number of new client connections per second. If this rate is exceeded, the server will become overloaded, and its performance will degrade, resulting in increased latency when establishing client connections, slow response times for established connections and/or the dropping of established client connections.

To eliminate overloading a server with new connections, conventional load balancers employ a technique known as connection pacing. When a new client connection request is directed to a server, using connection pacing technique, subsequent client requests are directed to other servers or are dropped until a specified period of time has passed (a "server pacing period"). Connection pacers, which implement connection pacing, must determine when to remove a server placed into a pacing state. Some connection pacers also determine when to put a server into a pacing state.

Conventional implementations of connection pacers have used a crawler approach to determine when a server may be removed from a pacing state. In such an approach, entries are maintained in a database, with one entry for each server, each entry containing information about the time the server may be removed from pacing state. When a connection is established, the time the server is next available (time_next_avail) is written into the crawler database. A separate crawler continually and sequentially trolls through all entries in the database and checks time_next_avail against the current time. When time_next_avail is less than the current time, the server has been in pacing state for the required server pacing period and is ready to be removed from such pacing state. To remove a server from a pacing state, a modification is made to the entry in the database associated with that server to change the pacing state of that server. Implementing a connection pacer using the technique described in this paragraph above results in:

(a) An increase in time in locating and removing from a pacing state a server whose server pacing period has expired;

(b) A reduction in the rate at which new connections can be established;

(c) A reduction in the number of clients that can be supported due to sub-optimal use of server resources;

(d) A reduction in accuracy in the time between establishing a connection to a server and subsequently making that server available for new connections; and (e) An increase in the minimum time between establishing a connection to a server and subsequently making that server available for new connections.

SUMMARY OF THE INVENTION

The described embodiments of the present invention implement connection pacing by making use of at least one first-in-first-out ("FIFO") buffer and a pacing controller that places entries into the FIFO buffer using pre-determined methods. By using one or more FIFO buffers, the connection pacer need only check the next_avail_time associated with the entries presented as output of the FIFO buffers. Since these buffers are FIFO buffers, the entries presented as outputs are the entries that have been in the buffers the longest and represent the servers in the network that have been in a pacing state the longest and are, therefore, most likely to have expired next_avail_time. Moreover, once the connection pacer has found an entry with an expired next_avail_time, that entry is removed from the FIFO buffer. Because it checks only a small number of FIFO entries in order to determine the proper pacing status of the servers, the connection pacer of the present invention can monitor and update the pacing state of each server in the network using a small number of cycles and resources, and more quickly remove from pacing state servers whose server pacing period has expired. The described embodiments of the present invention achieve:

(a) An increase in the rate at which new connections can be established;

(b) An increase in the number of clients which can be supported due to more efficient use of server resources;

(c) An increase in accuracy in the time between establishing a connection to a server and subsequently making that server available for new connections; and (d) A decrease in the minimum time between establishing a connection to a server and subsequently making that server available for new connections.

DETAILED DESCRIPTION OF THE PREFERRED EMBODIMENTS

In the following description, specific details are set forth in order to provide a thorough understanding of the present invention. However, it will be apparent to one skilled in the art that the present invention may be practiced without these specific details, and well-known circuits, structures and techniques have not been shown in detail in order to avoid obscuring the present invention.

Figure 1:
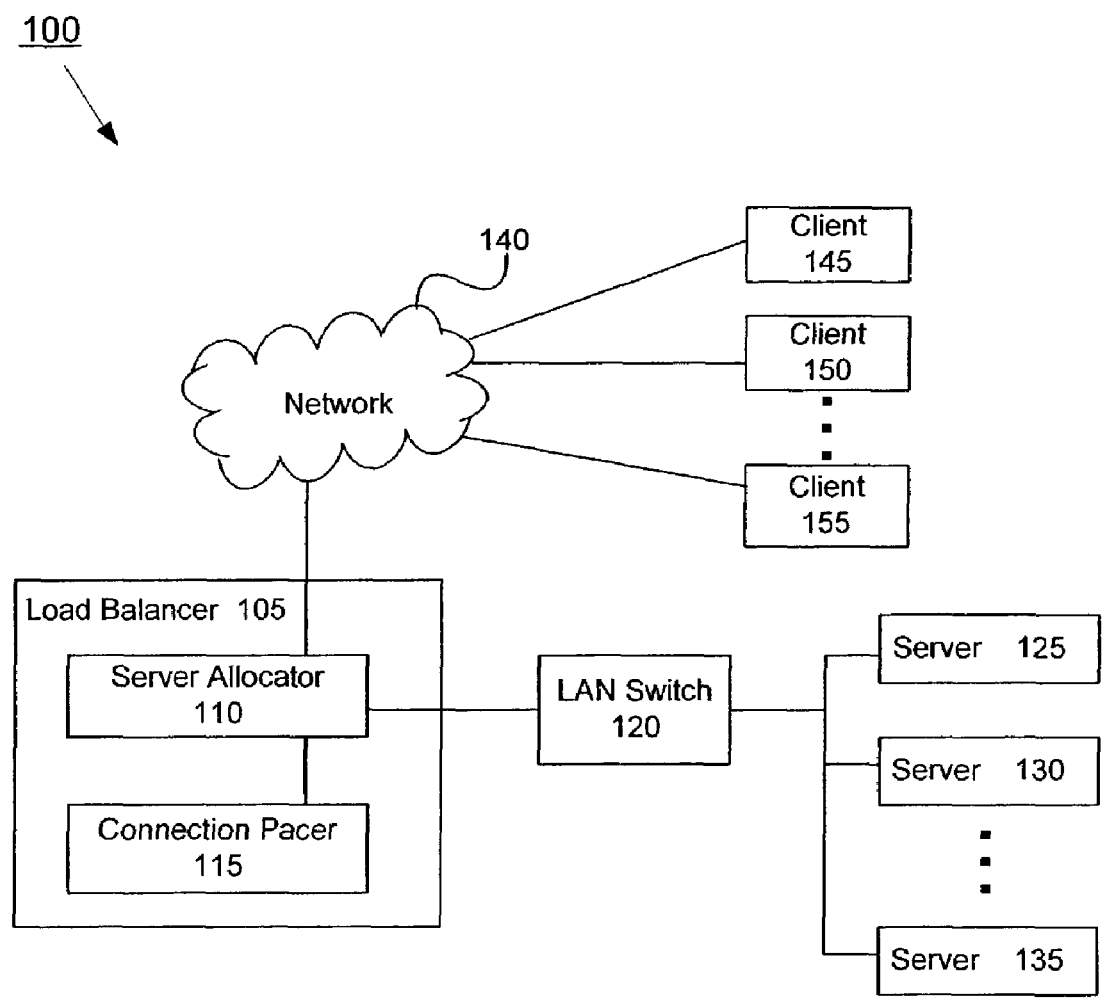
FIG. 1 is a block diagram of servers providing services over a network to clients according to one embodiment of the invention.

FIG. 1 depicts a network 100 having a plurality of clients 145, 150 . . . 155 and a plurality of servers 125, 130 . . . 135 for supporting a network 140 based service on, for example, Internet, LAN or WAN. As shown in FIG. 1, the servers 125, 130 . . . 135 are connected via a LAN switch 120 to a load balancer 105. The load balancer 105 is connected to the network 140. Each client 145, 150 . . . 155 typically includes a computing device (e.g., personal computer or wireless handheld device) and an application that requests services from one or more servers 125, 130 . . . 135. These applications can be, for example, Internet browsers, e-mail interfaces and other applications.

FIG. 1 shows further details of a load balancer 105 that includes a server allocator 110 and a connection pacer 115. The server allocator 110 is connected to the network 140 and to a LAN switch 120. The server allocator 110 and the connection pacer 115 are in communication with each other. The connection pacer 115 performs connection pacing and provides the server allocator 110 with pacing state information for each server 125, 130 . . . 135 in the network 100.

During operation of the network 100, the server allocator 110 receives information from one of the clients 145, 150 . . . 155 over the network 140. If the information the client sends is associated with an established connection, then the server allocator 110 forwards such client information to the server that was previously allocated for that connection. If the information represents a new client request, then the server allocator 110 accesses the connection pacer 115 to determine which servers 125, 130 . . . 135 in the network 100 are in a non-pacing state and, hence, available for allocation. The server allocator 110 then chooses one of the available servers using any appropriate method known in the art and forwards the client request to that server. The server allocator 110 informs the connection pacer 115 that the chosen server has been allocated. The connection pacer 115 then removes the chosen server from the list of servers available for allocation and puts the server in a pacing state. It should be noted that LAN switch 120 can also be incorporated within the load balancer 105 in certain embodiments, and that the server allocator 110 can be processor or hardware based.

Figure 2A:
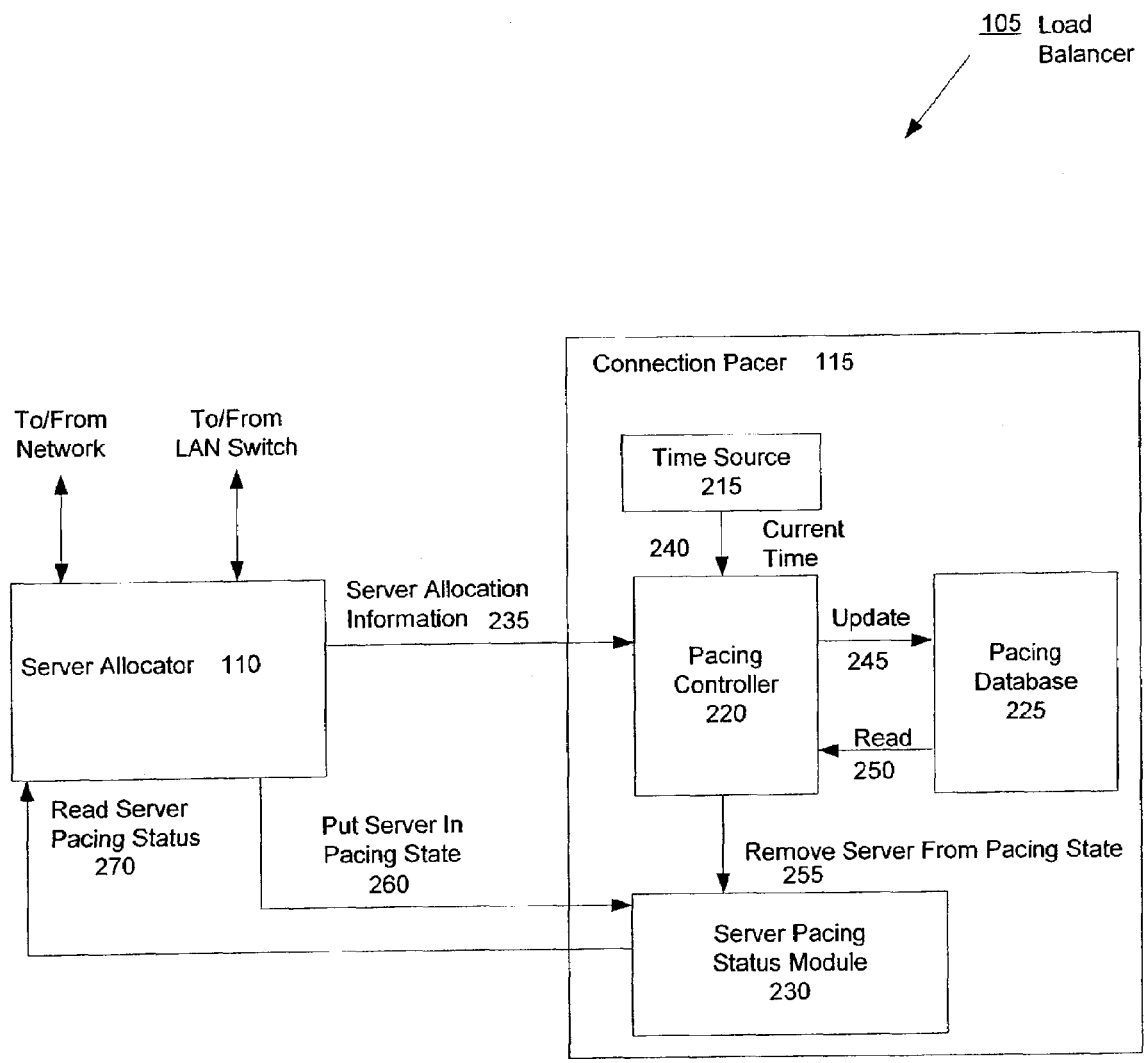
FIG. 2A shows details of a first embodiment of a load balancer.
Figure 2B:
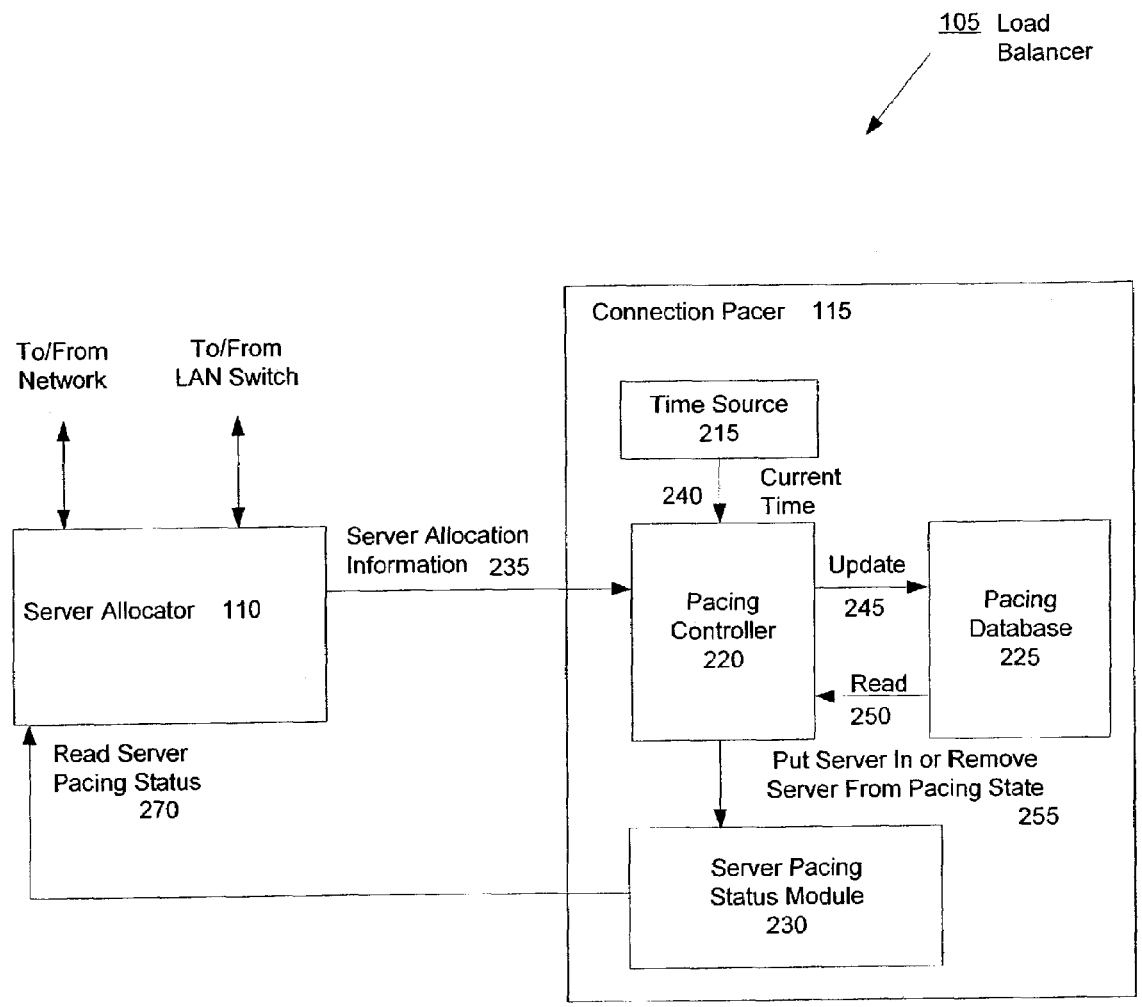
FIG. 2B shows a second embodiment of a load balancer.
Figure 2C:
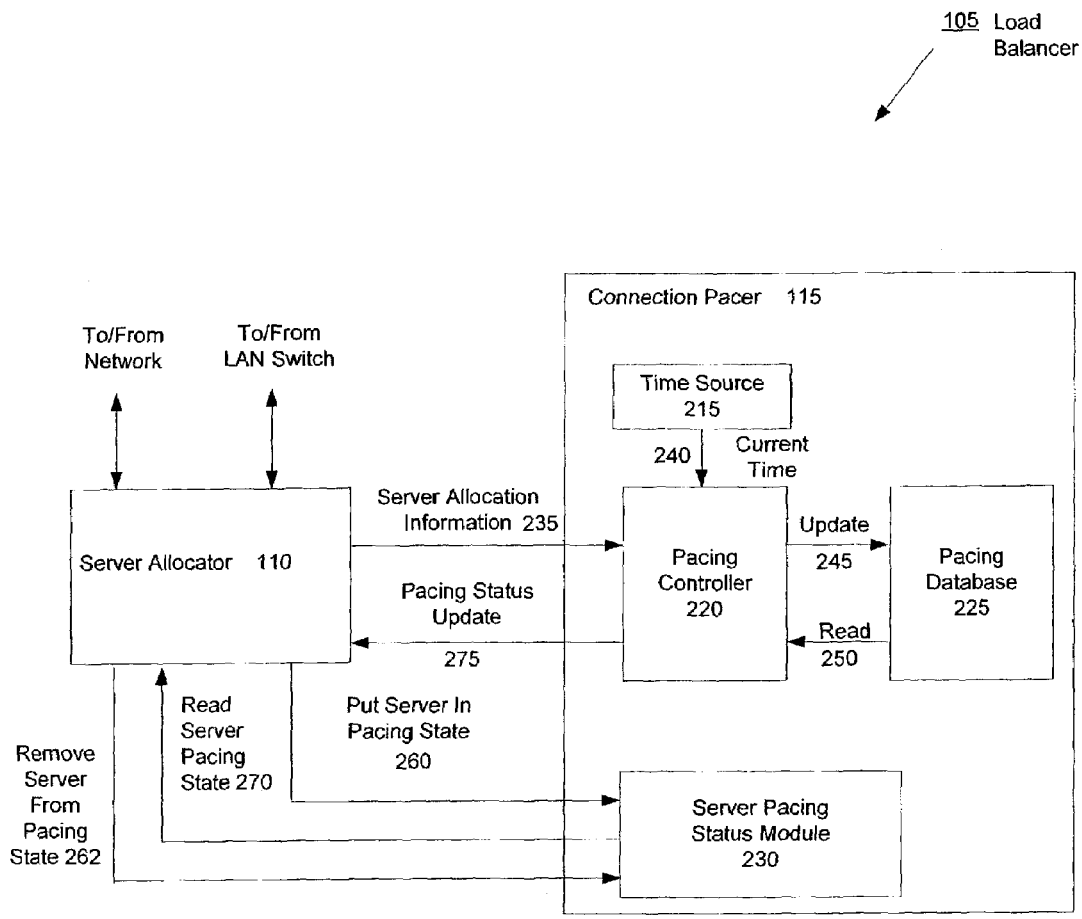
FIG. 2C shows a third embodiment of a load balancer.

FIGS. 2A-2C depict three embodiments of the load balancer 105, including the details of the connection pacer 115 and the different interfaces between the connection pacer 115 and the server allocator 110 amongst the three embodiments.

In all three embodiments, the connection pacer 115 includes a time source 215, a pacing controller 220, a pacing database 225 and a server pacing status module 230. It should be noted that the server pacer status module 230 may be incorporated within the server allocator 110.

The time source 215 maintains a time value that represents the current time 240. This value is continually presented to the pacing controller 220 or can be requested by pacing controller 220. The units in which time is measured can vary with the particular embodiment. The maximum value that can be generated by the time source 215 exceeds several times the maximum server pacing period a single server may be kept in a connection pacing state. When the maximum time value generated by the time source 215 is reached, the time value then preferably wraps to zero. Note that any method known in the state of the art for performing such wrapping may be used.

The pacing controller 220 receives server allocation information 235 from a server allocator 110 indicating, among other things, that a server has been allocated. The pacing controller 220 also supplies information regarding transition of servers to and from pacing state to the server allocator 110 or the server pacing status module 230, depending upon embodiment.

The pacing database 225 contains pacing data for each server in pacing state. The pacing data identifies, among other things, when each such server may be removed from the pacing state or, in some embodiments, the time the server was placed into pacing state. The pacing database 225 is updated 245 and read 250 by the pacing controller 220.

The server pacing status module 230 indicates, for each server in the network, whether that server is available for allocation. When a server is not available for allocation, it is considered to be in a "connection pacing state." Otherwise, when a server is available for allocation by the allocation server 10, it is in a "non-pacing state." The server pacing status module 230 may be read and written to directly by the server allocator 110 or indirectly via the pacing controller 220, depending upon the embodiment of the invention.

In a first embodiment of the present invention shown in FIG. 2A, the server pacing status module 230 is in direct communication with the server allocator 110. As shown in FIG. 2A, the server allocator 110 can put a server in a pacing state 260 by communicating directly with the server pacing status module 230. Similarly, the server allocator 110 can read the server pacing status 270 of a server directly from the server pacing status module 230 as shown in FIG. 2A. In this first embodiment, the "remove server from pacing state" signal 255 is simply a signal generated by the pacing controller 220 that indicates to the server pacing status module 230 when a server may be removed from pacing state.

In a second embodiment of the present invention shown in FIG. 2B, the server pacing status module 230 is in direct communication with the server allocator 110. As shown in FIG. 2B, the server allocator 110 can put a server in a pacing state, but only through the pacing controller 220. Specifically, in order to place a server in pacing state, the server allocator 110 sends server allocation information 235 to the pacing controller 220, which pacing controller 220 then records the server's state in the server pacing status module 230. The server allocator 110 can, however, read the server pacing status of a server 270 directly from the server pacing status module 230 as shown in FIG. 2B. In this second embodiment, the "put server in or remove server from pacing state" signal 255 is simply a signal generated by the pacing controller 220 that indicates to the server pacing status module 230 when a server should be put in or removed from pacing state.

In a third embodiment of the present invention shown in FIG. 2C, the server pacing status module 230 is in direct communication with the server allocator 110. As shown in FIG. 2C, the server allocator 110 can put a server in a pacing state via 260 by communicating directly with the server pacing status module 230, and can read the pacing status of a server via 270 from the server pacing status module 230. The pacing status update signal 275 generated by the pacing controller 220 indicates when a server is ready to be removed from pacing state. In this third embodiment, when the server allocator 110 receives a pacing status update 275 from the pacing controller 220, the server allocator 110 sends a "remove server from pacing state" signal 262 to the server pacing status module 230 to remove the server from pacing state.

Figure 3A:
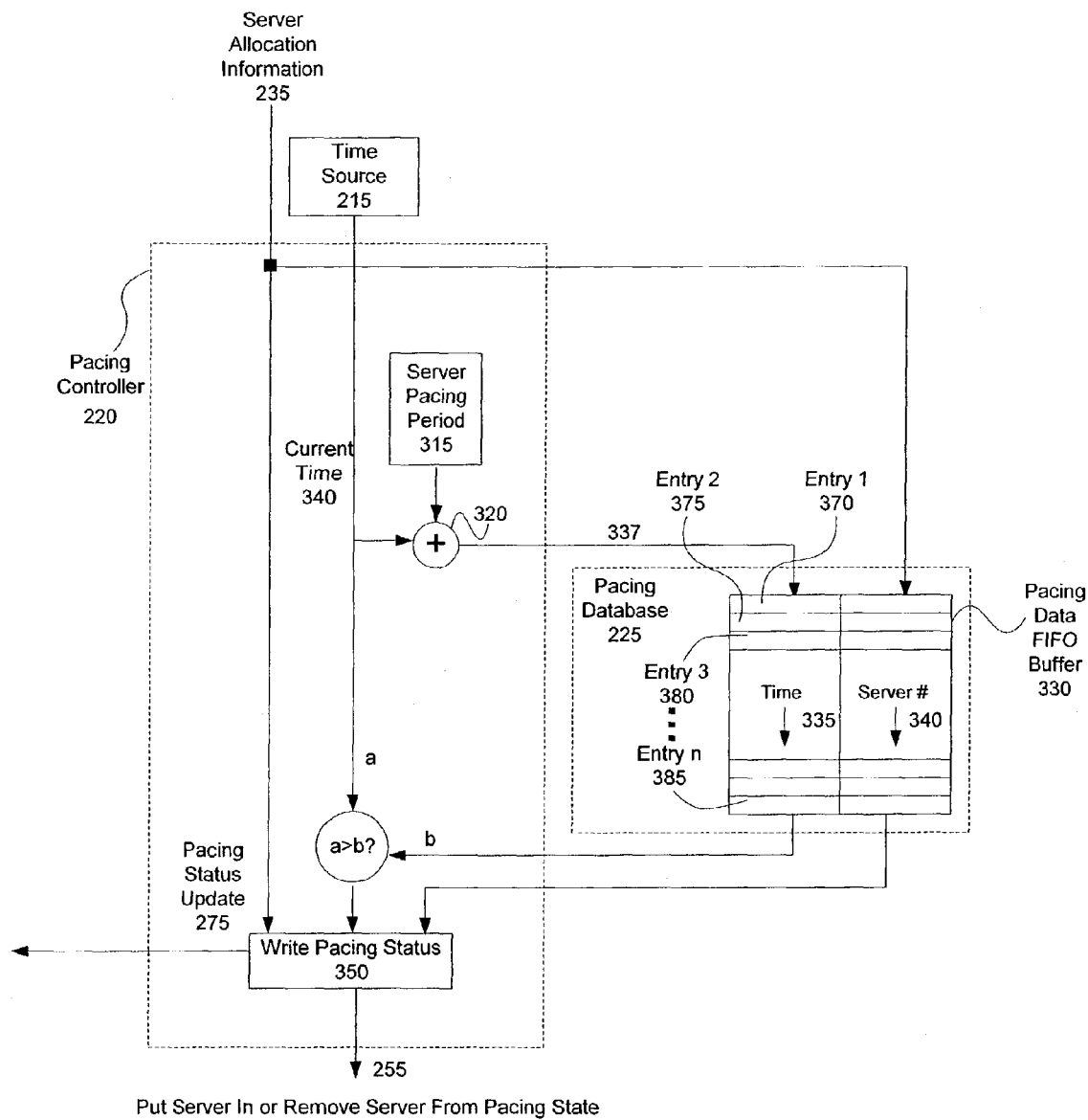
FIG. 3A shows a first embodiment of a pacing controller, a pacing database and a time source using a single pacing data FIFO buffer.

FIG. 3A illustrates the details of a first embodiment of a pacing controller 220, a pacing database 225 and a time source 215 supporting a single pacing period using a single pacing FIFO buffer. In this embodiment of the invention, all servers in pacing state remain in pacing state for the same period of time (i.e., they all have the same server pacing period). The pacing controller 220 includes a server pacing period 315, an adder 320, a comparator 345 and a write pacing status 350. The pacing database 225 includes a single pacing data FIFO buffer 330, which has the capacity to store one entry for each server in the network 100 that can be placed in a pacing state. The pacing data FIFO buffer 330, will contain zero to n entries, one entry for each server in pacing state, where n is the total number of servers 125, 130 . . . 135 in the network 100. Each entry 370, 375, 380 . . . 385 in the single pacing data FIFO buffer 330, has at least two items: (a) server information 340, such as a server number or some other identifier of the server; and (b) the time 335 such server may be removed from pacing state. The pacing data FIFO buffer 330 may be implemented with discrete FIFO parts, as part of an ASIC, with a memory and a separate FIFO controller, or with any other appropriate method known in the state of the art including, but not limited to, a linked list. The pacing data FIFO may use a buffer, queue or any other data structure known in the art for implementing a FIFO. The pacing controller 220 takes as input:

(a) server allocation information 235 from the server allocator 110;
(b) the output of the pacing database 225; and
(c) the current time 240 output by the time source 215.

The pacing controller 220 outputs:

(i) to the pacing database 225, server allocation information 235, such as server number or other server identification information, and the time 337 such server should be released from pacing state;
(ii) depending upon the embodiment, to the server pacing status module 230, information regarding whether to put a server in or remove a server from pacing state 255; and
(iii) depending upon the embodiment, to the server allocator 110, information regarding whether to remove a server from pacing state 275.

The pacing database 225 takes as input the outputs of the pacing controller 220, namely the server allocation information 235 and the current pacing time 337 such server should be released from pacing state, and presents as output the entry that has been in the pacing data FIFO buffer 330 the longest, such entry having a time component 335 and a server information component 340.

The inputs to the adder 320 are the outputs of the time source 215 (i.e., the current time 240) and the server pacing period 315. The inputs to the comparator 345 are the output of the time source 215 (i.e., the current time 240) and the time at which the server associated with the entry presented as output from the pacing database 225 may be removed from pacing state. The output of the comparator 345 produces a "yes" signal if the current time 240 is greater than or equal to the time at which the server associated with the entry presented as output from the pacing database 225 may be removed from pacing state. Otherwise, the comparator 345 produces a "no" signal.

The inputs to the write pacing status 350 are the outputs of the comparator 345 and the server information associated with the entry presented as output from the pacing database 225. In addition, in the embodiment of the invention shown in FIG. 2B, the write pacing status 350 has an additional input: server allocation information 235 from the server allocator 110. In this embodiment, write pacing status 350 produces a "put server in or remove server from pacing state" signal 255 to be sent to the server pacing status module 230. This signal 255 contains information identifying a server and information about whether to put the server in or remove a server from pacing state. In the embodiment shown in FIGS. 2A and 2C, there is no server allocation information 235 input to the write pacing status 350. In the embodiment shown in FIG. 2A, the write pacing status 350 produces a signal 255 to be sent to the server pacing status module 230. This signal 255 in the FIG. 2A embodiment contains information identifying a server and information to remove a server from pacing state. This signal 255 in the FIG. 2A embodiment does not indicate when to put a server in pacing state. Finally, in the embodiment shown in FIG. 2C there is no "put server in or remove server from pacing state" signal 255. In this embodiment, the write pacing status 350 sends an output pacing status update signal 275 to the server allocator 110. The pacing status update signal 275 contains information identifying a server to be taken out of pacing state. The implementation of the write pacing status 350 is well-known in the art and, hence will not be described here.

Figure 3B:
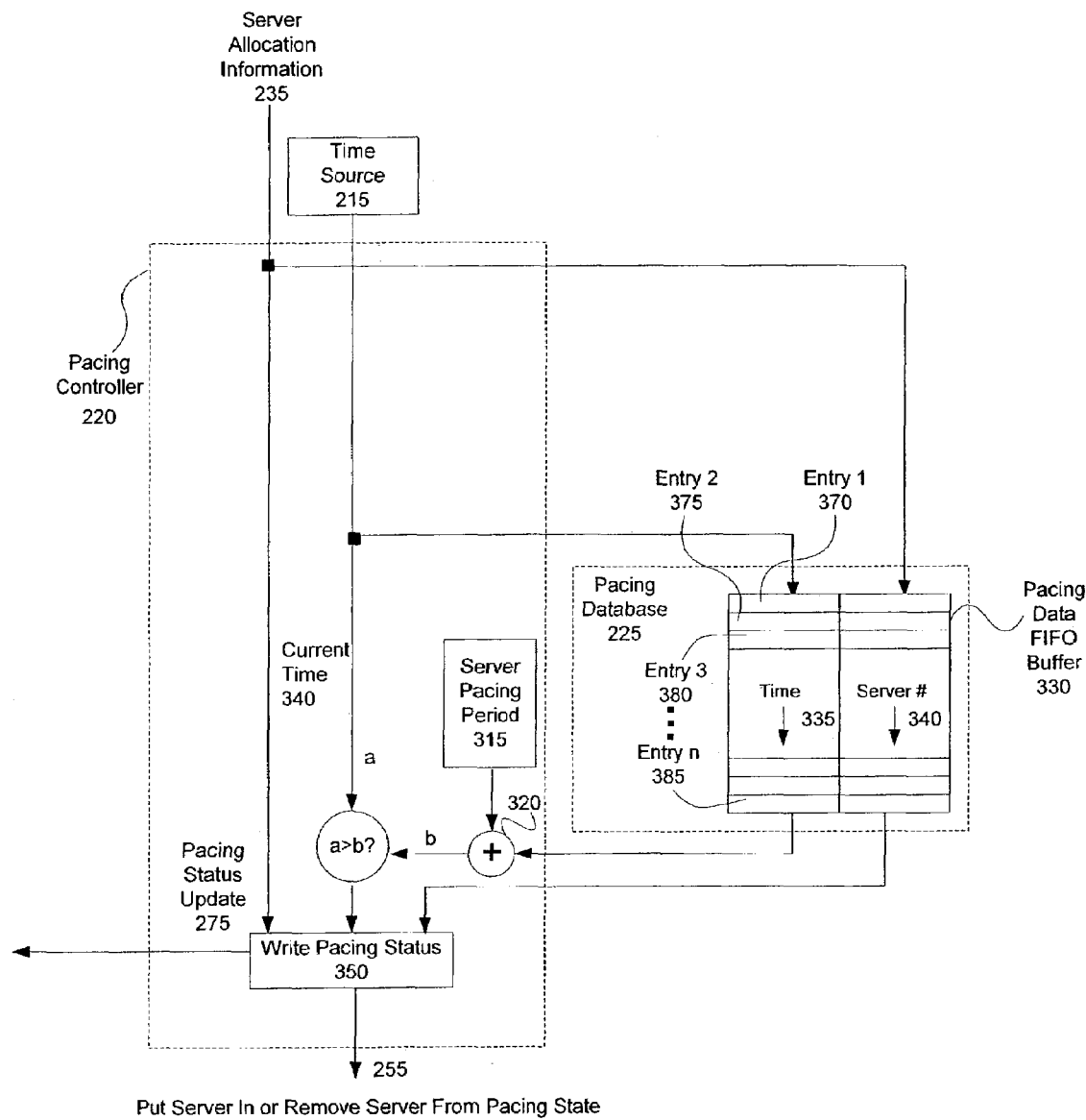
FIG. 3B shows a second embodiment of a pacing controller, a pacing database and a time source using a single pacing data FIFO buffer.

FIG. 3B illustrates the details of a second embodiment of a pacing controller 220, a pacing database 225 and a time source 215 supporting a single pacing period using a single pacing FIFO buffer. This embodiment is identical to the embodiment shown in FIG. 3A, except that rather than storing in the pacing database 225 the sum of the current time 240 and the output of the server pacing period 315 as shown in FIG. 3A, the pacing controller 220 in the embodiment showing in FIG. 3B stores in the pacing database 225 the current time 240 (i.e., the time the server is placed into pacing state). The pacing controller 220 in the embodiment shown in FIG. 3B then takes the time portion of the entry presented as output of the pacing database 225 (which represents the time the server associated with that entry was placed in pacing state), adds the output of the server pacing period 315 to such time and compares the result of the addition to the current time 240. If the current time 240 is greater than or equal to the result of the addition, the entry is removed from the pacing database 225 (i.e., the server has been in pacing state long enough and is removed from pacing state) according to the description associated with FIG. 3A. Note, the embodiments described in FIGS. 4 and 5 below may also use the technique described in FIG. 3B (where the time the server is placed into pacing state is stored in a pacing data FIFO buffer, rather than the time the server may be removed from pacing state), provided the server pacing period associated with the server being placed in pacing state is determined prior to storing an entry associated with such server in the pacing database. The time stored in the pacing database 225, whether the time the server may be removed from pacing state as in the embodiments illustrated in FIGS. 3A, 4 and 5 respectively, or simply the time the server is placed into pacing state as in the embodiment illustrated in FIG. 3B, may be referred to as "removal trigger time."

Figure 4:
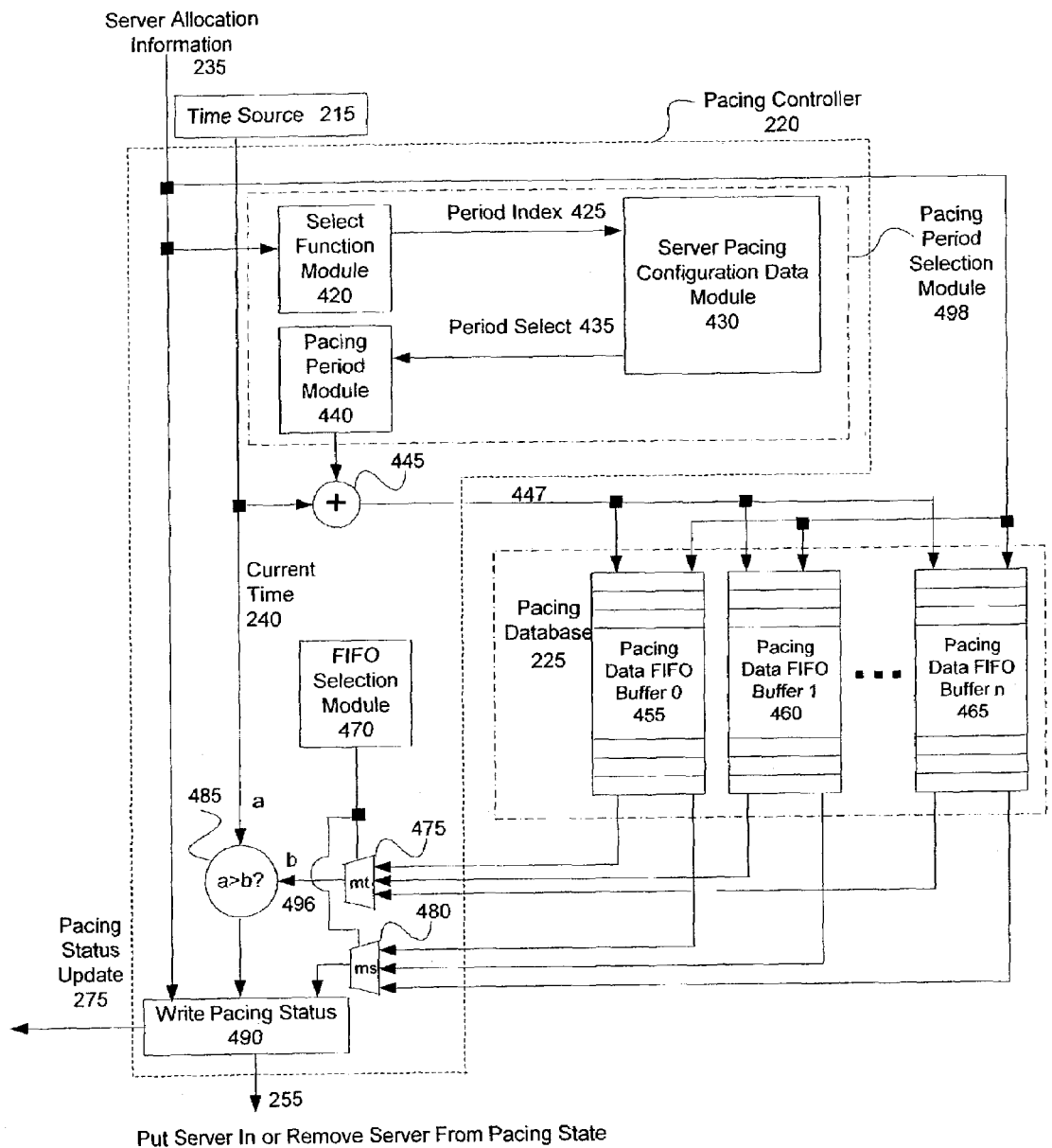
FIG. 4 shows an embodiment of a pacing controller, a pacing database and a time source using multiple pacing data FIFO buffers and a single comparator.

FIG. 4 illustrates the details of an embodiment of a pacing controller 220, a pacing database 225 and a time source 215 using a single comparator 485 and multiple pacing data FIFO buffers 455, 460 . . . 465. This embodiment of the invention supports multiple server pacing periods, one pacing data FIFO buffer for each server pacing period.

The pacing controller 220 illustrated in FIG. 4 consists of a pacing period selection module 498, an adder 445, a FIFO selection module 470, a comparator 485, an mt multiplexor 475, an ms multiplexor 480 and a write pacing status 490. The pacing database 225 consists of a plurality of pacing data FIFO buffers 455, 460 . . . 465, one buffer for each server pacing period supported by the connection pacer 115. Each pacing data FIFO buffer has the capacity to store one entry for each server in the network 100 that can be placed in a pacing state, and each pacing data FIFO buffer 455, 460 . . . or 465 will contain zero to n entries, where n is the total number of servers 125, 130 . . . 135 in the network 100. Each pacing data FIFO buffer 455, 460 . . . 465 has associated with it a server pacing period and only accepts entries having a server pacing period corresponding with the server pacing period associated with that buffer. For each server that is placed in pacing state by the server allocator 110, the pacing controller 220 puts an entry associated with that server into one of the pacing data FIFO buffers 455, 460 . . . 465, depending upon the server pacing period for such server. Each entry in the pacing data FIFO buffers 455, 460 . . . 465, has at least two items: (a) server information, such as a server number or some other identifier of the server; and (b) the time such server may be removed from pacing state. A pacing data FIFO buffer 455, 460 or 465 may be implemented with discrete FIFO parts, as part of an ASIC, with a memory and a separate FIFO controller, or with any other method known in the state of the art including, but not limited to, a linked list. The pacing data FIFOs may use buffers, queues or any other data structures known in the art for implementing a FIFO. The collection of pacing data FIFO buffers 455, 460 . . . 465 may be implemented with a single memory and a group of FIFO controllers or any other method known in the state of the art.

As illustrated in FIG. 4, the pacing controller 220 takes as input:

(a) server allocation information 235 from the server allocator 110;

(b) the output of the pacing database 225; and (c) the current time 240 output by the time source 215.

The pacing controller 220 outputs:

(i) to the pacing database 225, server allocation information 235, such as server number or other server identification information, and the time 447 such server should be released from pacing state;

(ii) depending on the embodiment, to the server pacing status module 230, information regarding whether to put a server in or remove a server from pacing state 255; and (iii) depending upon the embodiment, to the server allocator 110 information regarding whether to remove a server from pacing state 275.

The pacing database 225 takes as input the outputs of the pacing controller 220, namely the server allocation information 235 and the time such server should be released from pacing state, and the presents these values to the input of each pacing data FIFO buffer 455, 460 . . . 465.

The inputs to the adder 445 are the outputs of the time source 215 (i.e., the current time 240) and the pacing period selection module 498, and the output of the adder 445 is the sum of these two times, which represents the time the server associated with the server allocation information 235 should be released from pacing state. The inputs to the comparator 485 are the outputs of the time source 215 (i.e., the current time 240) and the time selected by the mt multiplexor 475. The output of the comparator 485 produces a "yes" signal if the current time 240 is greater than or equal to the time selected by the mt multiplexor 475. Otherwise, the comparator 485 produces a "no" signal. In essence, the comparator determines whether an entry associated with a server selected by the FIFO selection module 470 is ready to be removed from pacing state.

The inputs to the write pacing status 490 are the outputs of the comparator 485 and the server information associated with the entry selected by the FIFO selection module 470. In addition, in the embodiment of the invention shown in FIG. 2B, the write pacing status 490 has an additional input: server allocation information 235 from the server allocator 110. In this embodiment, write pacing status 490 produces a "put server in or remove server from pacing state" signal 255 to be sent to the server pacing status module 230. This signal 255 contains information identifying a server and information about whether to put the sever in or remove a server from pacing state. In the embodiment shown in FIGS. 2A and 2C, there is no server allocation information 235 input to the write pacing status 490. In the embodiment shown in FIG. 2A, the write pacing status 490 produces a signal 255 to be sent to the server pacing status module 230. This signal 255 in the FIG. 2A embodiment contains information identifying a server and information to remove a server from pacing state. This signal 255 in the FIG. 2A embodiment does not indicate when to put a server in pacing state. Finally, in the embodiment shown in FIG. 2C, there is no "put server in or remove server from pacing state" signal 255. In this embodiment, the write pacing status 490 sends an output pacing status update signal 275 to the server allocator 110. The pacing status update signal 275 contains information identifying a server to be taken out of pacing state. The implementation of the write pacing status 490 is well-known in the art and, hence will not be described here.

The FIFO selection module 470 uses any method known in the art to select amongst the multiple entries output by the pacing database 225 including, for example, selecting entries sequentially in a "round-robin" fashion, quasi-sequentially in a "modified round-robin" fashion where entries from one or more pacing data FIFO buffers are selected more frequently than entries from others, or where the entry selected is based upon information contained in the previous selected entry from the pacing database 225. The mt multiplexor 475 takes as input the output of the FIFO selection module 470 and the time portion of the entries output by the pacing database 225, and selects the time portion of one of such entries. This selected time serves as an input to the comparator 485. Similarly, the ms multiplexor 480 takes as input the output of the FIFO selection module 470 and the server information portion of the entries output by the pacing database 225, and selects the server information portion of one of such entries. This selected server information serves as input to the write pacing status 490. The output selected by the mt multiplexor 475 is the time the server selected by the ms multiplexor 480 should be released from pacing state.

The pacing period selection module 498 simply determines an appropriate server pacing period for an associated server that has been selected by the server allocator 110. In one embodiment, as illustrated in FIG. 4, such pacing period selection module 498 consists of a select function module 420, a server pacing configuration data module 430 and a pacing period module 440. The select function module 420 takes as input server allocation information 235 output by the server allocator 110 and outputs a period index 425. The period index 425 is input into a server pacing configuration data module 430 to generate a period select 435. The period select 435 then serves as an index into the pacing period module 440 to permit selection of an appropriate server pacing period for a given server associated with the server allocation information 235.

In one embodiment, the period index 425 is the result of a concatenation of information identifying the server that has been selected by the server allocator 110 and any other information required by the select function module 420 to calculate a period index 425, such as the type of service requested or connection being established, the number of connections already made to such server, the time since the last connection to such server and any other type of information regarding such server or the connection to it. In one embodiment, the server pacing configuration data module 430 contains for each server in the network, a set of period select values, one period select value associated with each type of service supported by the network. There may be period select values in the server pacing confirmation data module 430 that have the same values. There is a one to one mapping between the period select values 435 and the pacing data FIFO buffers 455, 460 . . . 465. This period select 435 is not a server pacing period (i.e., not a time), but rather an index into the pacing period module 440. Based upon the period index 425 (containing, in one embodiment, server number and type of service requested), the server pacing configuration data module 430 outputs a period select 435. This period select 435, which as stated above is an index, is input into the pacing period module 440. The pacing period module 440 then is able to determine the appropriate server pacing period (i.e., a period time) for the allocated server based upon the period select 435. There is a one to one relationship between period select values 435 and server pacing periods.

Figure 5:
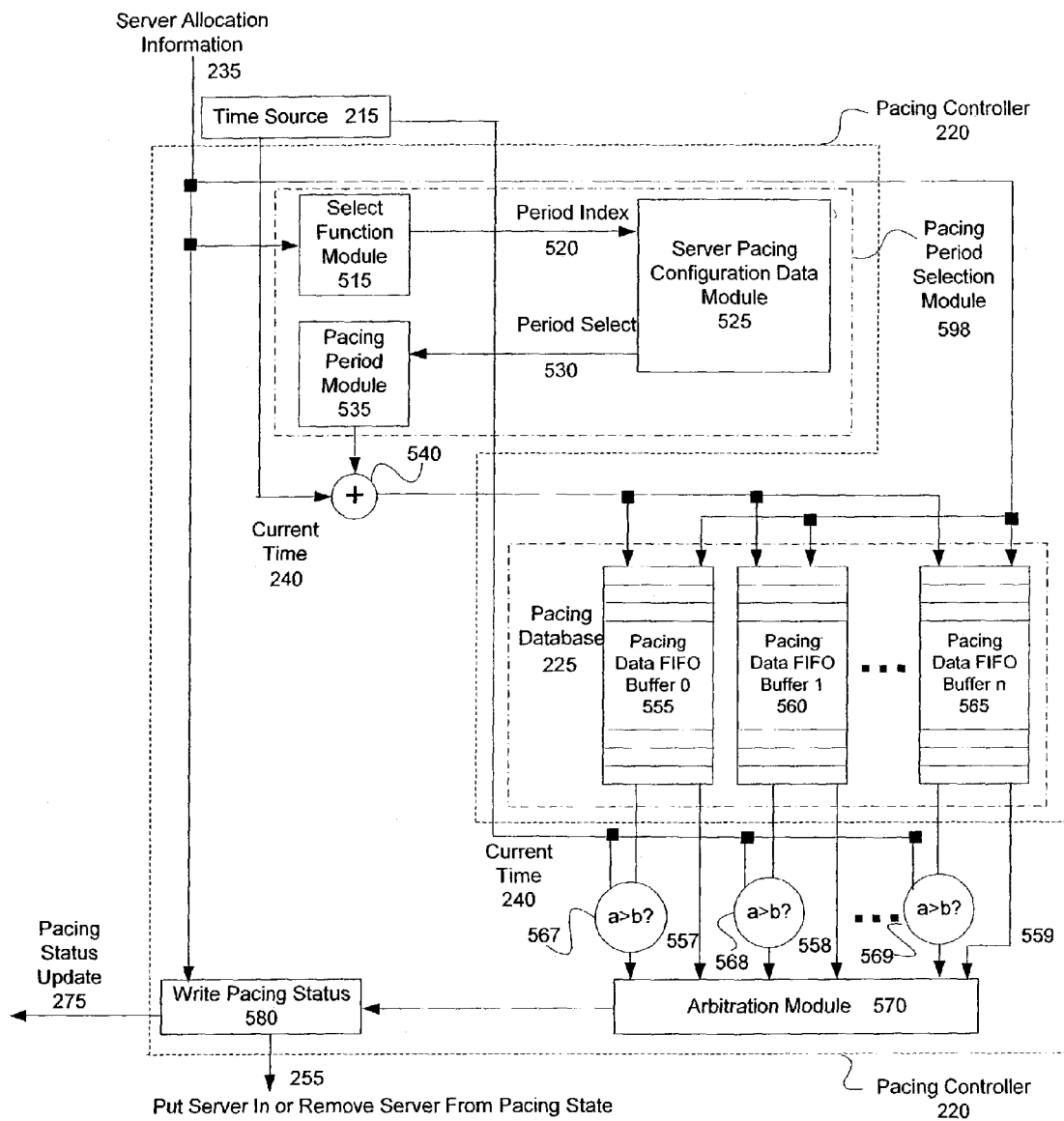
FIG. 5 shows another embodiment of a pacing controller, a pacing database and a time source using multiple pacing data FIFO buffers and multiple comparators.

Although the outputs of the pacing data FIFO buffers are shown as being read sequentially (i.e., not simultaneously) as determined by the FIFO selection module 470 in the embodiment illustrated in FIG. 4, it should be obvious to one versed in the art that the pacing data FIFO buffers may be read simultaneously, and each output of a pacing data FIFO buffer sent to a separate comparator. The results of the comparators may then be treated as requests, and any arbitration scheme known in the state of the art may be used to select among these requests. FIG. 5 illustrates the details of an embodiment of a pacing controller 220, a pacing database 225 and a time source 215 using multiple comparators 567, 568 . . . 569 and multiple pacing data FIFO buffers, which are read simultaneously.

In FIG. 5, the pacing database 225 and time source 215 are identical to the pacing database 225 and time source 215 shown in FIG. 4. The pacing controller 220 illustrated in FIG. 5, like the pacing controller 220 illustrated in FIG. 4, consists of a pacing period selection module 525, an adder 540 and a write pacing status 580. The pacing period selection module 525, adder 525 and write pacing status 580 of FIG. 5 are identical to the pacing period selection module 498, adder 445 and write pacing status 490 of FIG. 4. However, unlike the pacing controller 220 in FIG. 4, the pacing controller 220 in FIG. 5 uses multiple comparators 567, 568 . . . 569, one comparator for each pacing data FIFO buffer 555, 560 . . . 565, respectively. Each comparator 567, 568 . . . 569 has as input the current time 240 and the time portion of the entry presented as output of the pacing data FIFO buffer associated with such comparator. The output of each comparator 567, 568 . . . 569 produces a "yes" signal if the current time 240 is greater than or equal to the time portion of the entry presented as output of the pacing data FIFO buffer associated with such comparator. Otherwise, the comparator produces a "no" signal. In essence, each comparator determines whether the entry output by the pacing data FIFO buffer associated with such comparator is ready to be removed from pacing state.

The outputs of all comparators 567, 568 . . . 569, along with the server information associated with each entry output by the pacing data FIFO buffers 555, 560 . . . 565, are input into the arbitration module 570. The arbitration module 570, using methods known in the state of the art, selects one of the server information portions 557, 558 . . . 559 output by a pacing data FIFO buffer 555, 560 . . . 565 whose comparator 567, 568 . . . or 569, respectively, produced a "yes" signal. Examples of methods used by the arbitration module 570 include a "round-robin" selection method, a "modified round-robin" method, a method based upon the FIFO buffer from which the last server selected came and a method based upon which FIFO buffer was least recently used. The arbitration module 570 then sends such server information and the pacing state associated with such server information to the write pacing status 580 and, depending upon the embodiment, the write pacing status 580 would send a signal, either a pacing status update 275 to the server allocator 110 or a remove server from pacing state signal 255 to the server pacing status module 230.

In another embodiment of the multiple comparator and multiple pacing data FIFO buffer implementation of the present invention, multiple outputs from the pacing data FIFO buffers may be input into each comparator. This implementation would combine the techniques described above for the single comparator implementation and the multiple comparator implementation. In such an embodiment, each comparator would have associated with it an arbiter that would use any algorithm known in the state of the art to choose one output amongst the multiple outputs presented by the pacing data FIFO buffers coupled to such comparator. Such arbiter may, for example, include mt and ms multiplexors and a FIFO selection module. The time portion of the entry associated with the output from the pacing data FIFO buffer selected by the arbiter would then serve as input to the associated comparator. The outputs of all comparators, along with server information associated with the entries selected by the arbiters, would be input into a separate arbitration module. This arbitration module, using methods known in the art, would select one of the server information portions whose comparator produced a "yes" signal. The separate arbitration module would then send such server information and pacing state associated with such server information to the write pacing status 580 and, depending upon the embodiment, the write pacing status 580 would send a signal, either a pacing status update signal 275 to the server allocator 110 or a remove server from pacing state signal to the server pacing status module 230.

Figure 6:
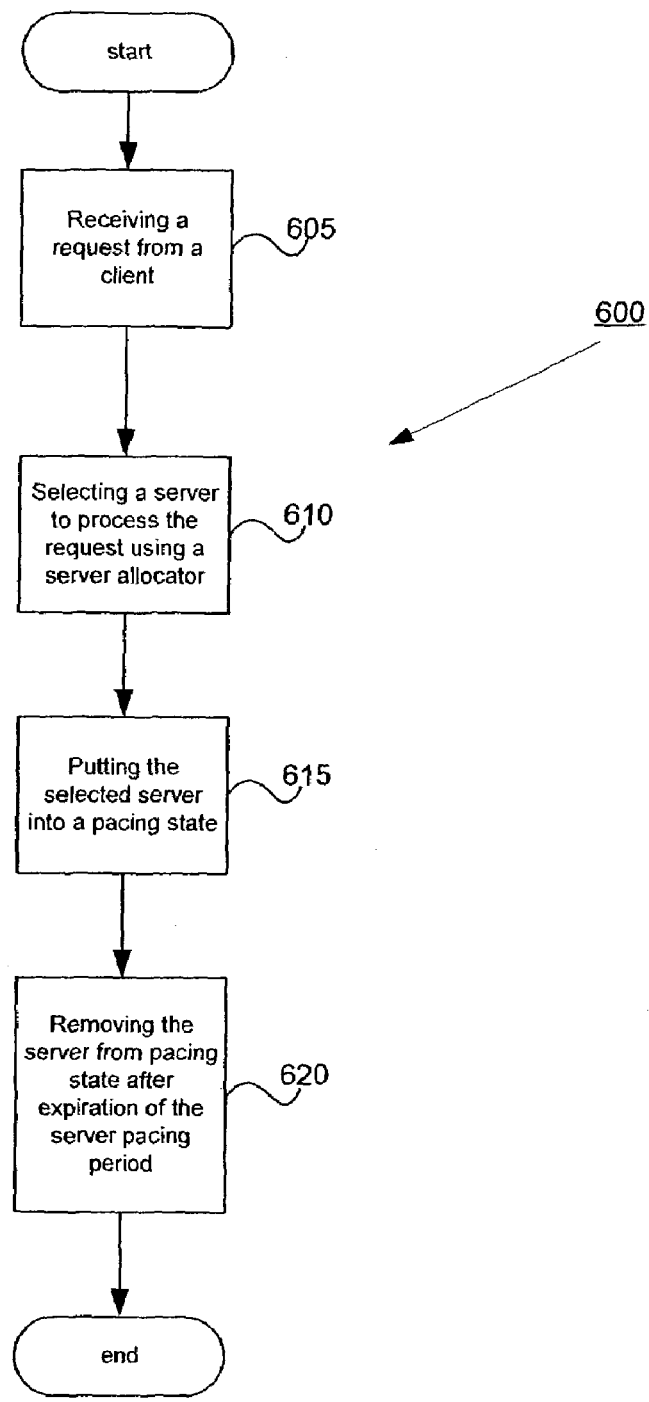
FIG. 6 shows one method of performing connection pacing.

FIG. 6 is a flow diagram illustrating the details of one method of performing connection pacing. After a client has sent a request for service through the network 140, the load balancer 105 receives 605 the request for service. The server allocator 110 in the load balancer 105 selects 610 a server to process the request using any algorithm known in the state of the art, and the connection pacer 115 puts 615 the selected server into a pacing state. The connection pacer 115 then removes 620 the server from pacing state after expiration of the server pacing period.

Figure 7:
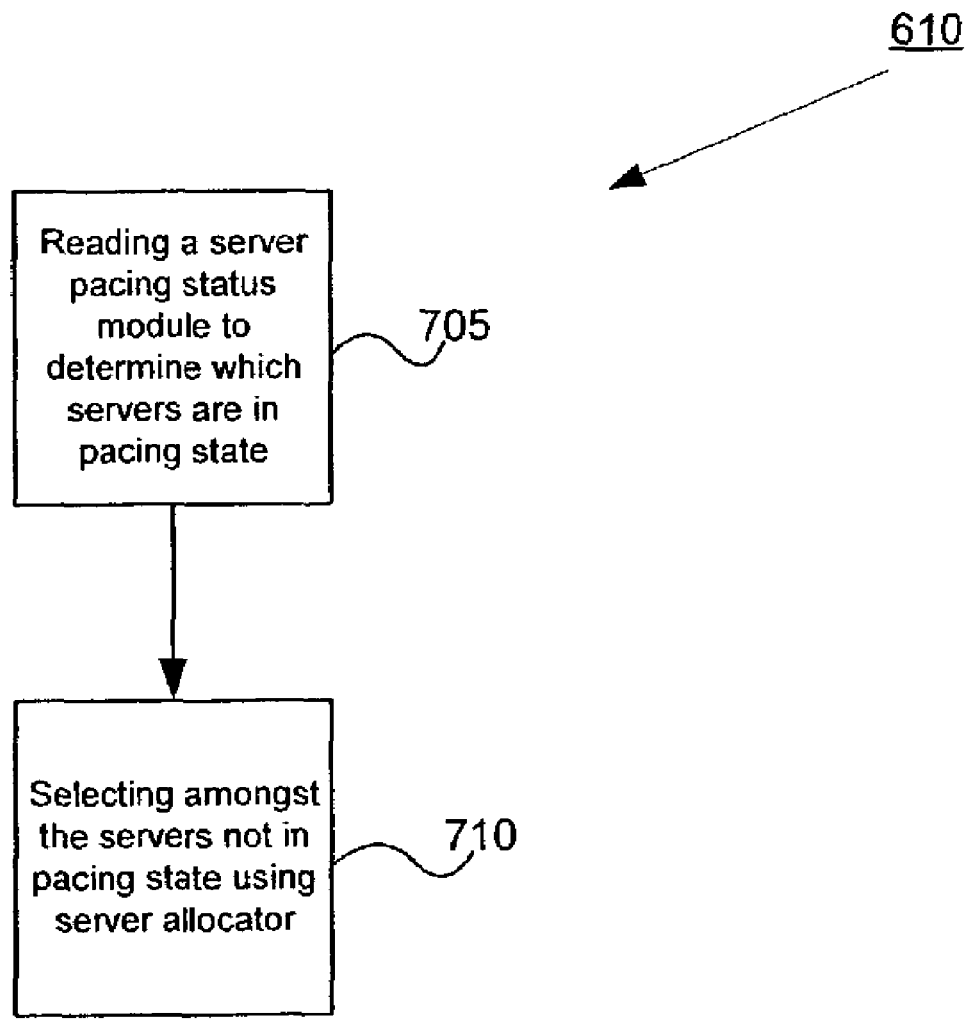
FIG. 7 shows one method of selecting a server to process a request.

FIG. 7 is a flow diagram illustrating the details of one method of selecting a server to process a request using a server allocator 110. The server allocator 110 reads 705 the server pacing status module 230 to determine which servers are in a pacing state. The server allocator 110 then selects 710 one server, using any algorithm known in the art, amongst the servers not in a pacing state to process the service requested by a client.

Figure 8:
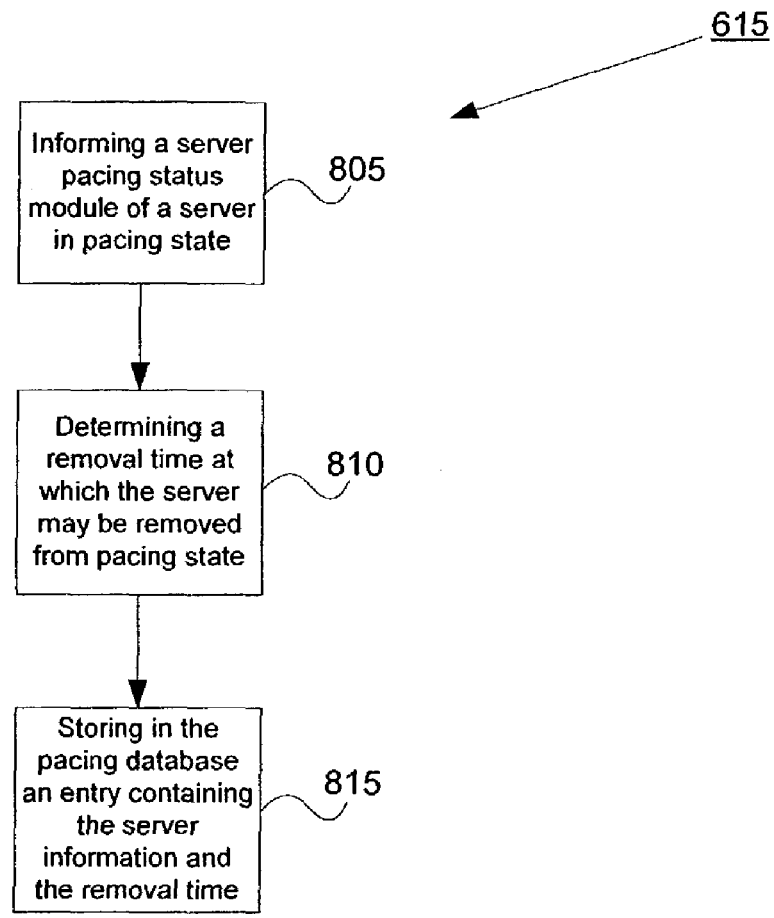
FIG. 8 shows one method of putting the selected server into a pacing state.

FIG. 8 is a flow diagram illustrating the details of one method of putting the selected server into a pacing state using a connection pacer 115. Depending upon the embodiment, either the pacing controller 220 or the server allocator 110 informs 805 the server pacing status module 230 that the server selected by the server allocator 110 has been placed into a pacing state. The pacing controller 220 determines 810 a removal time at which the server may be removed from pacing state. An entry containing server information and the removal time, then is stored 815 in the pacing database 225. In an embodiment which uses the pacing controller 220 to inform 805 the server pacing status module 230, the pacing controller 220 extracts the identifying information from the server allocation information 235. The identifying information regarding the server is then passed to a write pacing status 350, 490 or 580 in FIG. 3A, 3B, 4 or 5, respectively, which then writes to a server pacing status module 230. In an embodiment that uses the server allocator 110, the server allocator informs 805 the server pacing status module 230 directly of the new pacing state of a server. This invention is not limited to the methods of informing described in this paragraph, but instead covers any method of informing known in the art. In an alternative embodiment using the technique associated with FIG. 3B, an entry containing server information and the time the server entered pacing state is stored in the pacing database 225.

In the single pacing data FIFO buffer implementations, such as shown in FIGS. 3A and 3B, the entry is stored 815 in the only FIFO in the pacing database 225. In the multiple pacing data FIFO buffer implementations such as shown in FIGS. 4 and 5, each pacing data FIFO buffer has associated with it a server pacing period. The server pacing period associated with a pacing data FIFO buffer may (but need not) be unique. The entry is stored 815 in the pacing data FIFO buffer having a server pacing period corresponding to the server pacing period for the server associated with such entry.

Figure 9:
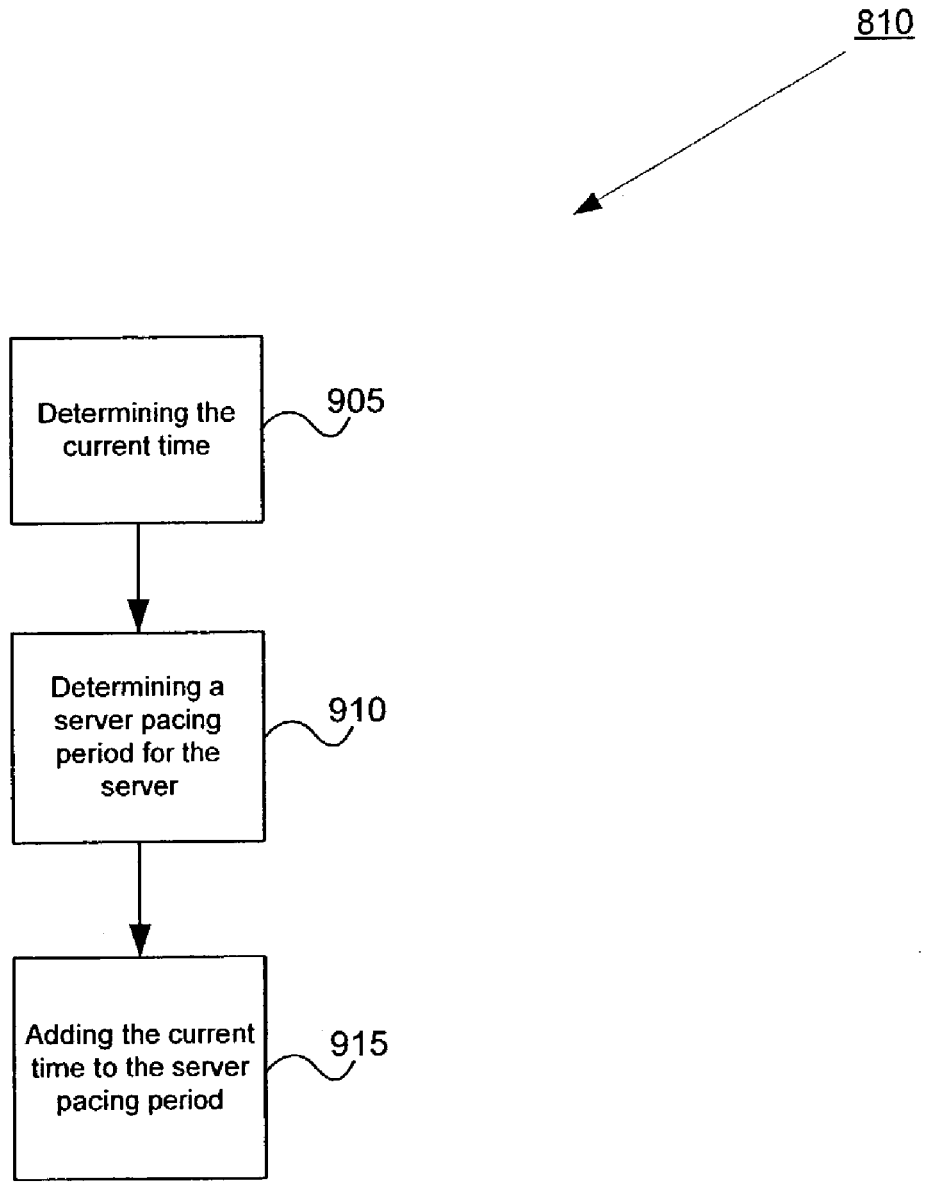
FIG. 9 shows one method of determining a removal time.

FIG. 9 is a flow diagram illustrating the details of one method of determining a removal time. The time source 215 determines 905 the current time 240 for the pacing controller 220. In the pacing controller 220, either the server pacing period 315 (in the embodiment of the invention using a single pacing data FIFO buffer as illustrated in FIGS. 3A and 3B) or the pacing period selection module 498 or 598 (in the embodiments of the invention using multiple pacing data FIFO buffers as illustrated in FIGS. 4 and 5, respectively) determines 910 the server pacing period for the server. Using an adder 320, 445 or 540, the pacing controller 220 then adds 915 the current time 240 to the determined server pacing period.

Figure 10:
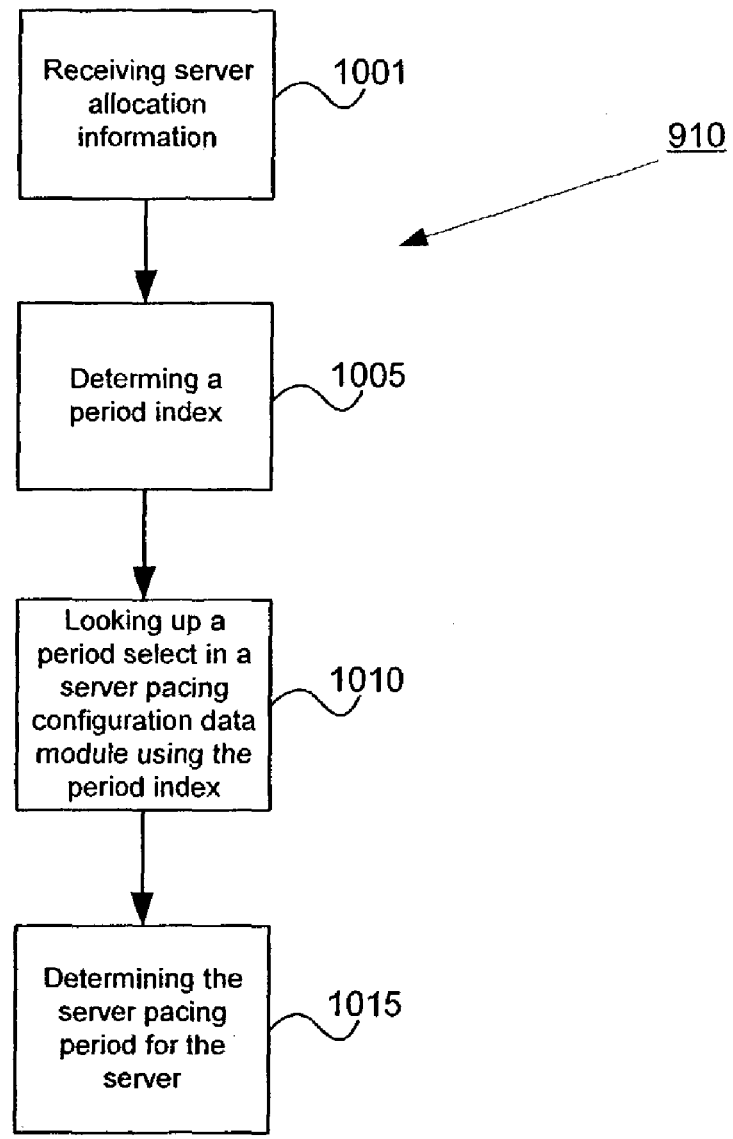
FIG. 10 shows one method of determining the server pacing period.

FIG. 10 is a flow diagram illustrating the details of one method of determining the server pacing period used by the multiple pacing data FIFO buffer embodiments illustrated in FIGS. 4 and 5. In the method shown in FIG. 10, the pacing controller 220 receives 1001 server allocation information 235. The select function module 420 or 515 in the pacing controller 220 determines 1005 a period index 425 or 520 given the server allocation information 235. The server pacing configuration data module 430 or 525 then looks up 1010 a period select 435 or 530 based upon the period index 425 or 520. Finally, the pacing period module 440 or 535 determines 1015 the server pacing period for the server based upon the period select 435 or 530 generated by the server pacing configuration data module 430 or 525. The select function module 420 or 515 may determine 1005 a period index by extracting identifying information about the server selected by the server allocator 110 from the server allocation information 235 and concatenating it with other information about the server or connection, such as the type of connection being established or service requested, the number of connections already made to such server or the time since the last connection to such server.

Figure 11:
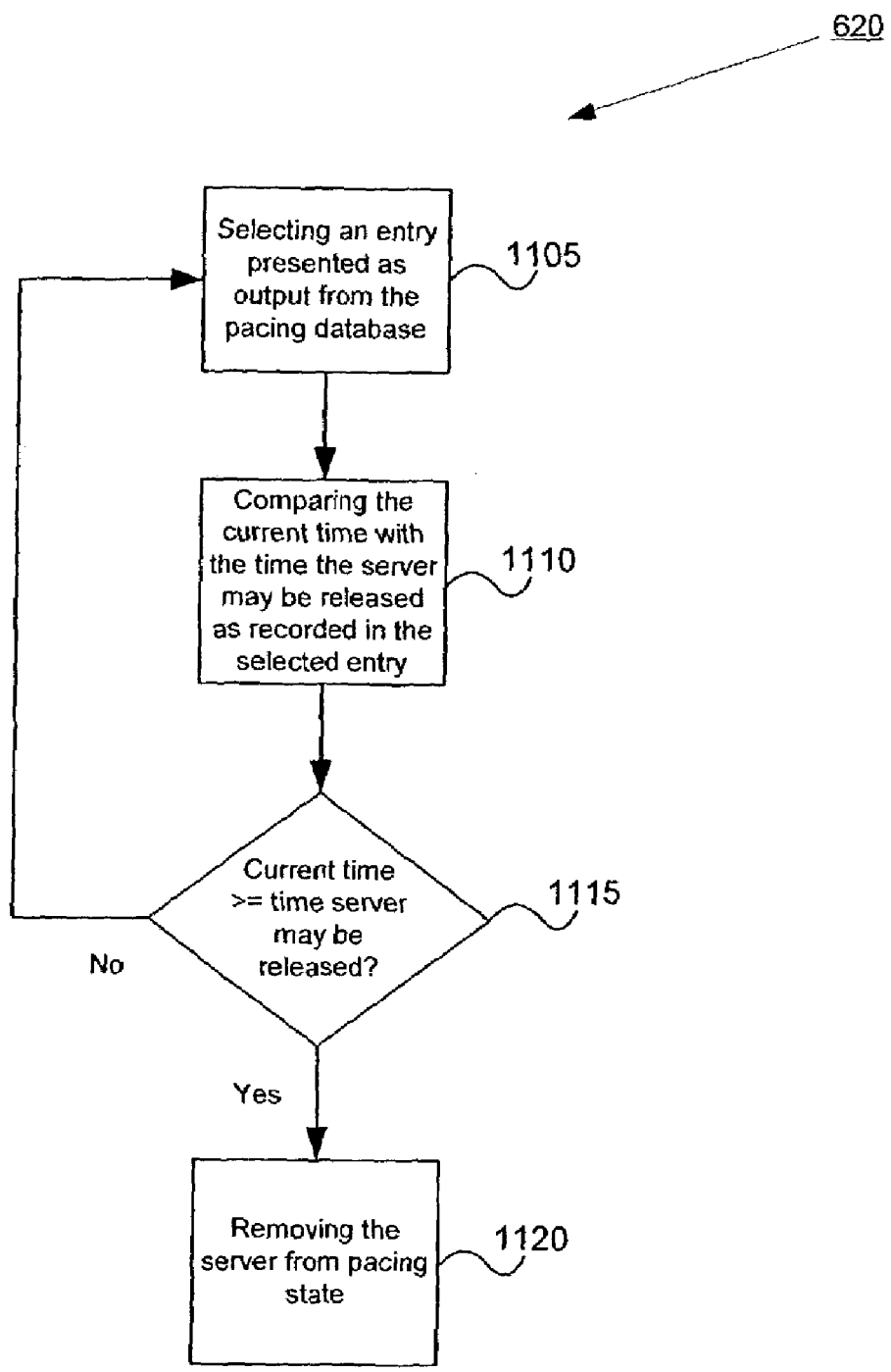
FIG. 11 shows one method of removing the server from pacing state after expiration of the server pacing period in a single comparator implementation.

FIG. 11 is a flow diagram illustrating the details of one method of removing the server from pacing state after expiration of the server pacing period in a single comparator implementation. The method shown in FIG. 11 implements the single comparator embodiments illustrated in FIGS. 3A, 3B and 4. In the embodiment shown in FIG. 4, the FIFO selection module 470 selects 1105 one of the multiple entries presented as output from the pacing database 225. In the embodiments shown in FIGS. 3A and 3B, the pacing controller 220 selects 1105 the only entry presented as output from the pacing database 225, which database contains a single pacing data FIFO buffer 330. The comparator 485 or 345, as applicable, compares 1110 the current time 240 with the time the server associated with the selected entry should be released from pacing state. If the current time 240 is greater than or equal to such time, the server has been in the connection pacing state for the required period of time, and the comparator 485 or 345, as applicable, produces a "yes" output signal, and the connection pacer 115 removes 1120 the server from pacing state. Otherwise, the comparator 485 or 345, as applicable, produces a "no" output signal and the pacing controller 220 repeats steps 1105 through 1115 of FIG. 11 as described above.

Figure 12:
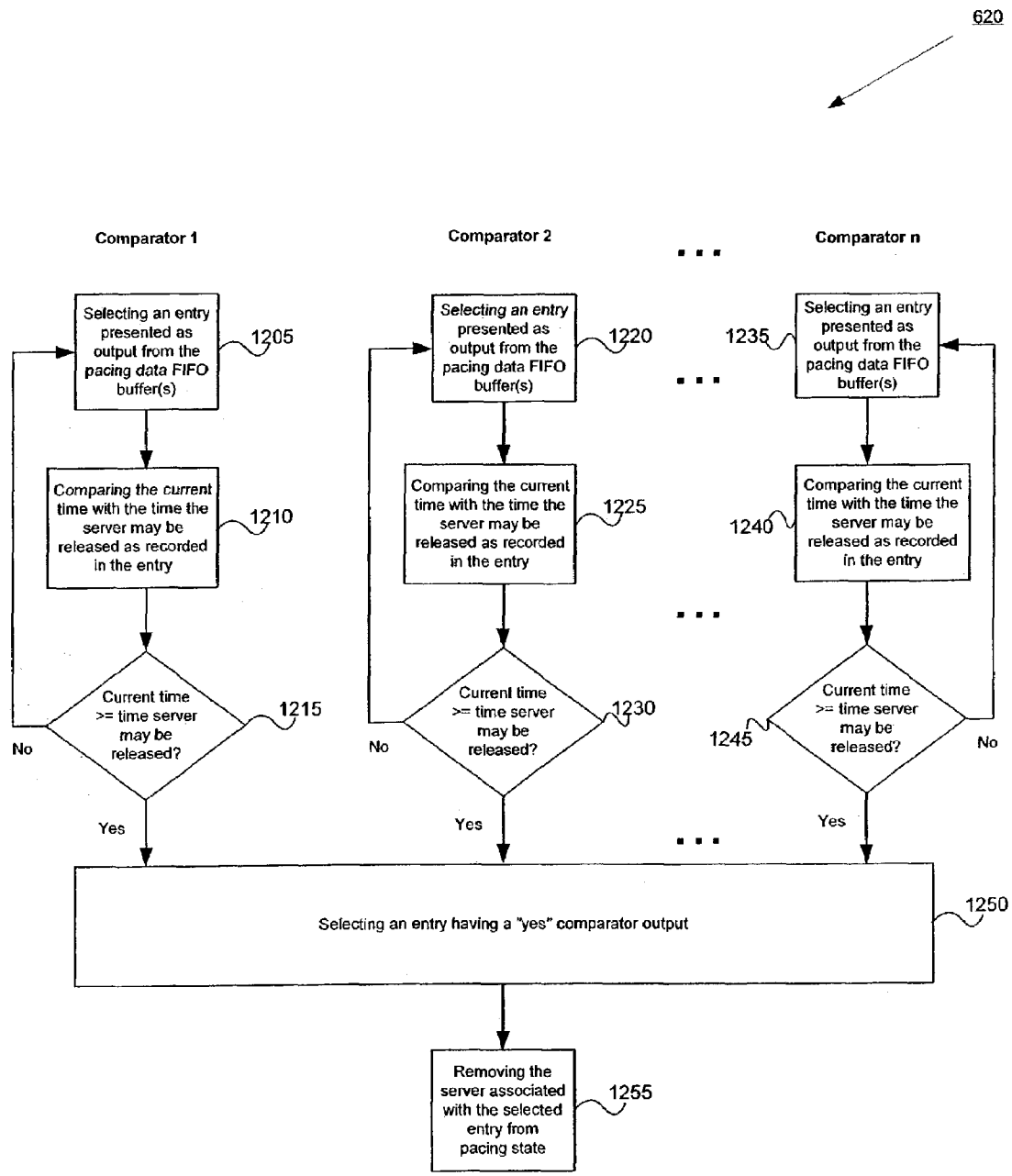
FIG. 12 shows one method of removing the server from pacing state after expiration of the server pacing period in a multiple comparator implementation.

FIG. 12 is a flow diagram illustrating the details of one method of removing the server from pacing state after expiration of the server pacing period in a multiple comparator implementation. In the embodiment shown in FIG. 12, for each comparator, comparator 1, comparator 2 . . . comparator n, the pacing controller 220 selects 1205, 1220 . . . 1235 one entry from the pacing data FIFO buffers as input to the comparator. In the embodiment shown in FIG. 5, there is only one pacing data FIFO buffer coupled to each comparator, so the entry selected is simply the output of the pacing data FIFO buffer associated with the comparator. However, in the embodiment where more than one pacing data FIFO buffer is associated with a comparator, the pacing controller 220 must select 1205, 1220 . . . 1235 amongst the outputs of the pacing data FIFO buffers. After an entry has been selected 1205, 1220 . . . 1235 for each comparator, the comparators 557, 568 . . . 569 compare 1210, 1225 . . . or 1240 the current time 240 with the time the server associated with the selected entry should be released from pacing state. If the current time 240 is greater than or equal to such time 1215, 1230 . . . or 1245, the server has been in the connection pacing state for the required period of time, and the comparator 567, 568 . . . 569, as applicable, produces a "yes" output signal. The arbitration module 570 then selects 1250 an entry having a "yes" comparator output, and the connection pacer 110 removes 1255 the server associated with that entry from pacing state. If a comparator 557, 568 . . . and 569 produces a "no" output signal, the pacing controller 220 repeats steps 1205 through 1215 for comparator 1, steps 1220 through 1230 for comparator 2 . . . and steps 1235 through 1245 for comparator n, as described above.

Figure 13:
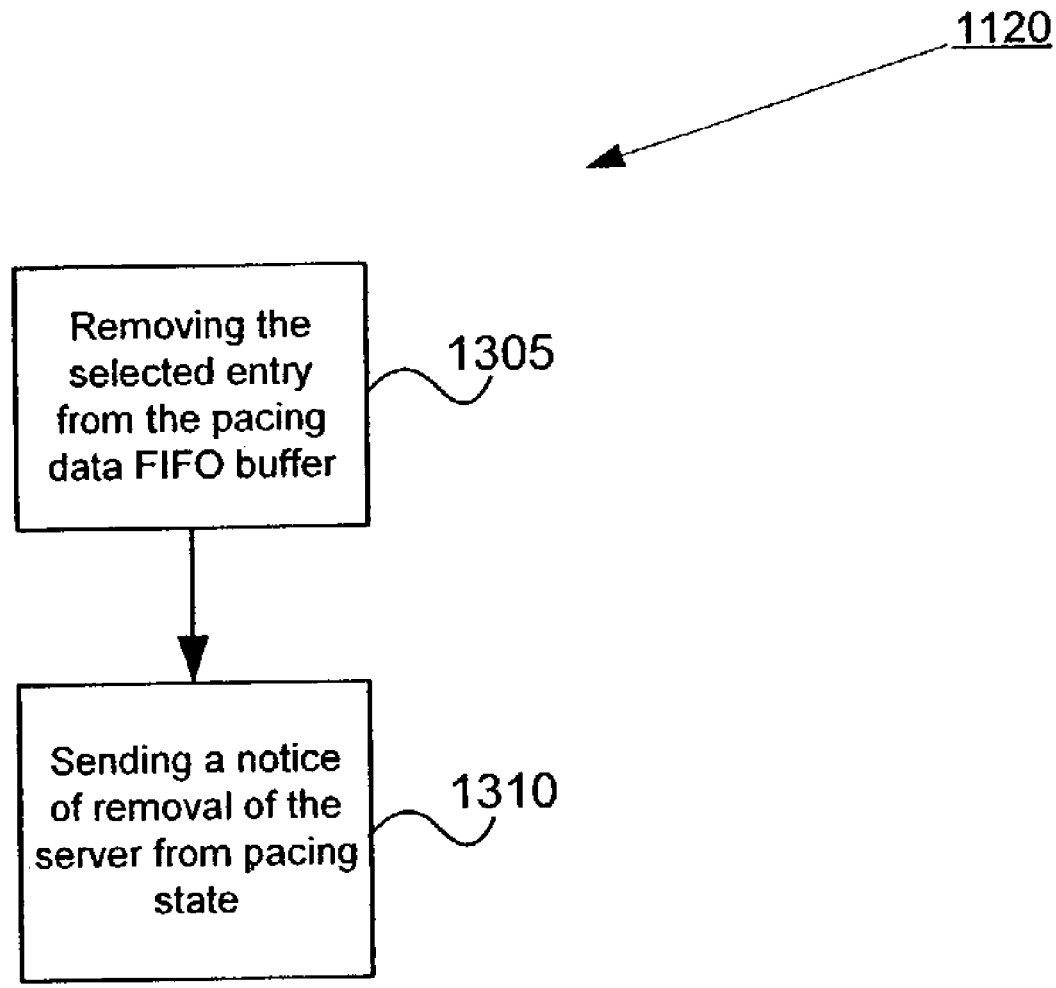
FIG. 13 shows one method of removing the server from pacing state.

FIG. 13 is a flow diagram illustrating the details of one method of removing a server from pacing state. In the method shown in FIG. 13, the pacing controller 220 removes 1305 the selected server from pacing state by removing the entry from the pacing data FIFO buffer from which the entry came and sends 1310 via a write pacing status 350, 490 or 580, as applicable, a "remove server from pacing state" signal 255 (which includes identifying information about the server to be removed) to the server pacing status module 230 in order to update the server pacing status module 230. The identifying information about the server may be obtained from: (a) in the embodiments shown in FIGS. 3A and 3B, the server portion of the output of the pacing database 225; (b) in the embodiment shown in FIG. 4, the output of the ms multiplexor 480, which selects the server associated with the time compared by the comparator 485; or (c) in the embodiment shown in FIG. 5, the server portion of the output of the arbitration module 570. In another method shown in FIG. 13, the pacing controller 220 removes 1305 the server from pacing state by removing the entry from the pacing data FIFO buffer from which the entry came and sends 1310 notice of removal of the server from pacing state directly to the server allocator 110 via the pacing status update signal 275. Again, the information sent to the server allocator 110 would include identifying information about the server to be removed form pacing state. Either way, subsequent access to the server pacing status module 230 will indicate that the server is in a non-pacing state and is available for allocation. Moreover, the entry in the pacing data FIFO buffer associated with the server has been removed and, hence, no longer checked by the pacing controller 220.

Finally, returning to the linked list implementation of the pacing data FIFO buffers, all of the pacing data FIFO buffers may be implemented with a single memory which contains multiple linked lists. Methods for implementing linked lists are well known in the state of the art and are, therefore, not described here. Using a linked list, rather than a fixed FIFO, allows the pacing data FIFO buffer sizes to change dynamically, depending on how many servers use a particular network. Moreover, another advantage of using a linked list implementation is that it saves space since the number of entries (and, hence, the amount of memory) required to implement the FIFO buffers, which is n, is less than the number of entries required for a non-linked list implementation, which requires n times the number of FIFO buffer entries.

What is claimed is:

1. A connection pacer to pace the establishment of connections in a network of servers and clients, the connection pacer comprising:
a pacing controller to receive from a server allocator server allocation information informing the pacing controller of an allocation of a server in the network performed by the server allocator, the allocated server to connect to a client in the network, the pacing controller further to send a first signal in response to receiving the server allocation information;
a server pacing status module coupled to the pacing controller, the server pacing status module to store, in response to the first signal, connection pacing status information indicating that the allocated server is in a connection pacing state, wherein the allocated server is unavailable for any allocation to establish a network connection while in the connection pacing state;
a pacing first-in-first-out (FIFO) buffer coupled to the pacing controller, the pacing FIFO buffer to store connection pacing data for one or more servers in a pacing state, wherein the pacing controller is further to update the pacing FIFO buffer in response to receiving the server allocation information, the updating including the pacing FIFO buffer storing an entry for the allocated server, the entry having,
an identifier of the allocated server, and
a removal trigger time indicating a time when the allocated server can be removed from the connection pacing state; and
wherein the pacing controller is further to read the entry for the allocated server at an output of the pacing FIFO buffer, the pacing controller further to perform a comparison of a first value based on the removal trigger time of the read entry with a second value based on time information from a time source, and wherein in response to the comparison, the pacing controller is further to signal the server pacing status module to remove the allocated server from the connection pacing state, the removing including storing connection pacing status information indicating that the allocated server is available to establish a connection.

2. The connection pacer of claim 1, wherein the removal trigger time of the entry is the time such entry may be removed from connection pacing state.

3. The connection pacer of claim 1, wherein the removal trigger time of the entry is the time the allocated server was placed into connection pacing state.

4. The connection pacer of claim 1, further comprising:
a server allocator in communication with the server pacing status module, the server allocator to choose a server in the network for establishing a connection, the choosing based at least in part on the connection pacing status information.

5. The connection pacer of claim 1
wherein the pacing FIFO buffer is one of a plurality of pacing FIFO buffers in a pacing database of the connection pacer, the pacing database including a pacing FIFO buffer for each network server supported by the connection pacer, each pacing FIFO buffer having a server pacing period associated with it, wherein an entry associated with a server is placed in a pacing FIFO buffer that has a server pacing period corresponding to a server pacing period of the server, each pacing FIFO buffer to present as output a longest-stored entry.

6. The connection pacer of claim of claim 1 wherein the pacing FIFO buffer is a linked list.

7. The connection pacer of claim 2 wherein the pacing controller comprises:
a server pacing period to determine an amount of time a server in the network will be in a connection pacing state;
an adder to compute the removal trigger time of the allocated server by adding a first current time to the determined amount of time from the server pacing period;
a comparator to indicate that a second current time is greater than or equal to the removal trigger time of the allocated server; and
a write pacing status coupled to the comparator and the pacing FIFO buffer, the write pacing status to indicate, based at least in part on the output of the comparator and the pacing FIFO buffer, that the allocated server is to be removed from connection pacing state.

8. The connection pacer of claim 3 wherein the pacing controller comprises:

a server pacing period to determine an amount of time a server in the network will be in a connection pacing state;

an adder to compute the time at which the allocated server may be removed from connection pacing state by adding the removal trigger time of the entry and the determined amount of time from the server pacing period;

a comparator to indicate that a current time is greater than or equal to the computed time at which the allocated server may be removed from connection pacing state; and a write pacing status coupled to the comparator and the pacing FIFO buffer, the write pacing status to indicate, based at least in part on the output of the comparator and the pacing FIFO buffer, that the allocated server is to be removed from connection pacing state.

9. The connection pacer of claim 5 further comprising:

a pacing period selection module to receive server allocation information and to produce the server pacing period for the server associated with the server allocation information;

an adder to compute the removal trigger time by adding the current time to the pacing period from the pacing period selection module, the adder further to provide the computed time to the pacing database for recordation;

a FIFO selection module to provide an indication of one of the pacing FIFO buffers in the pacing database;

an mt multiplexor to receive the indication from the FIFO selection module and the times at which the servers associated with the entries presented as outputs from the pacing database may be removed from connection pacing state, the mt multiplexor to select one of the times based upon the indication from the FIFO selection module;

an ms multiplexor to receive the indication from the FIFO selection module and the server information associated with the entries presented as outputs from the pacing database, the ms multiplexor to select the server information of one of the servers based upon the indication from the FIFO selection module, wherein the server information selected by the ms multiplexor is associated with the time selected by the mt multiplexor;

a single comparator to indicate that a current time is greater than or equal to the time selected by the mt multiplexor; and a write pacing status coupled to the comparator and the ms multiplexor, the write pacing status to receive (a) server allocation information, and (b) the outputs of the comparator and the ms multiplexor, the write pacing status to indicate that a server may be removed from connection pacing state.

10. The connection pacer of claim 5 wherein the pacing controller comprises:

a pacing period selection module to receive server allocation information and to produce the server pacing period for the server associated with the server allocation information;

an adder to compute a removal trigger time for the associated server by adding a first current time to a pacing period from the pacing period selection module, the adder further to provide the computed removal trigger time to the pacing database for recordation;

a plurality of comparators, one comparator associated with each pacing FIFO buffer, each comparator to indicate that a second current time is greater than or equal to the time associated with the entry presented as output by the each pacing FIFO buffer;

an arbitration module to receive the outputs of the comparators and the server information of entries presented as outputs of the pacing FIFO buffers, the arbitration module to select the server information of one of the entries from the pacing FIFO buffers based on the received outputs of the comparators; and a write pacing status coupled to the arbitration module to receive (a) the server allocation information associated with the entries presented as outputs by the pacing FIFO buffers, and (b) the output of the arbitration module, the write pacing status further to indicate that a server may be removed from connection pacing state.

11. The connection pacer of claim 9 wherein the pacing controller is capable of informing a server allocator of the removal of a server from connection pacing state.

12. The connection pacer of claim 9 wherein the FIFO selection module uses a round robin method of selection.

13. The connection pacer of claim 9 wherein the pacing period selection module comprises:

a select function module to receive server allocation information and to produce a period index associated with the server allocation information;

a server pacing configuration data module containing a set of period selects for each server in the network, the server pacing configuration data module to receive the period index output by the select function module and to produce a period select; and a pacing period module containing a set of time periods for which a server may be placed into connection pacing state, the pacing period module to receive the period select output produced by the server pacing configuration data module, the pacing period module further to produce a server pacing period for input into the adder in the pacing controller.

14. A method to pace the establishment of connections in a network of servers, comprising:

receiving at a pacing controller server allocation information sent from a server allocator, the server allocation information informing the pacing controller of an allocation of a server in the network performed by the server allocator, the allocated server to connect to a client in the network;

the pacing controller sending a first signal to a server pacing status module in response to receiving the server allocation information;

storing connection pacing status information by the server pacing status module, the storing in response to the first signal, the connection pacing status information indicating that the allocated server is in a connection pacing state, wherein the allocated server is unavailable for any allocation to establish a network connection while in the connection pacing state;

in response to the receiving the server allocation information, the pacing controller updating a pacing first-in-first-out (FIFO) buffer storing connection pacing data for one or more servers in pacing state, the updating including the pacing FIFO buffer storing an entry for the allocated server, the entry having, an identifier of the allocated server, and a removal trigger time indicating a time when the allocated server can be removed from the connection pacing state;

the pacing controller reading the entry for the allocated server at an output of the pacing FIFO buffer;

the pacing controller performing a comparison of a first value based on the removal trigger time of the read entry with a second value based on time information from a time source; and in response to the comparison, the pacing controller signaling the server pacing status module to remove the allocated server from the connection pacing state, the removing including storing connection pacing status information indicating that the allocated server is available to establish a connection.

15. The method of claim 14 further comprising:
determining a removal time at which the allocated server may be removed from the pacing state; and
wherein the removal trigger time of the entry includes the determined removal time.

16. The method of claim 14 wherein updating the pacing FIFO buffer comprises:
determining a server pacing period for the allocated server;
determining a first current time that the allocated server is placed into a pacing state; and
storing the entry for the allocated server in the pacing FIFO buffer based on the pacing FIFO buffer having associated with it a server pacing period corresponding to the determined server pacing period, wherein the removal trigger time of the entry is the determined first current time.

17. The method of claim 14 further comprising informing a server pacing status module of the server in connection pacing state.

18. The method of claim 14 wherein performing the comparison of the first value based on the removal trigger time of the read entry with the second value based on time information from the time source comprises:
comparing a current time with the removal trigger time of the entry for the allocated server; and
if the current time is greater than or equal to the removal trigger time of the entry for the allocated server, removing the server from connection pacing state.

19. The method of claim 14 wherein storing an entry in the pacing FIFO buffer comprises:
determining a first current time;
determining a server pacing period for the allocated server;
determining a removal time at which the allocated server may be removed from the pacing state by adding the first current time to the server pacing period;
selecting the pacing FIFO buffer amongst a plurality of pacing FIFO buffers in a pacing database, each of the plurality of pacing FIFO buffers associated with a different respective server pacing period, the pacing FIFO buffer having associated with it a server pacing period corresponding to the server pacing period of the allocated server; and
storing in the selected pacing FIFO buffer.

20. The method of claim 14 wherein updating the pacing FIFO buffer comprises:
determining a first current time;
determining a server pacing period for the allocated server;
selecting the pacing FIFO buffer amongst a plurality of pacing FIFO buffers in a pacing database, the selected pacing FIFO buffer having associated with it a server pacing period corresponding to the server pacing period of the allocated server; and
storing in the selected pacing FIFO buffer an entry, wherein the removal trigger time of the entry is the determined first current time.

21. The method of claim 15 wherein determining a removal time at which the allocated server may be removed from the pacing state comprises:
determining a current time;
determining a server pacing period for the allocated server; and
adding the current time to the server pacing period.

22. The method of claim 16 wherein performing the comparison of the first value based on the removal trigger time of the read entry with the second value based on time information from the time source comprises:
determining a second current time;
calculating a time the allocated server is to be removed from pacing state by adding the server pacing period to the removal trigger time of the entry for the allocated server;
comparing the second current time with the calculated time; and
if the second current time is greater than or equal to the calculated time, removing the first server from pacing state.

23. The method of claim 18 further comprising selecting one pacing FIFO buffer entry amongst a plurality of pacing FIFO buffer entries, each entry presented as output from a different respective pacing FIFO buffer in a pacing database.

24. The method of claim 19 further comprising informing a server pacing status module that the server is in a connection pacing state.

25. The method of claim 19 wherein performing the comparison of the first value based on the removal trigger time of the read entry with the second value based on time information from the time source comprises:
selecting one entry amongst a plurality of entries presented as output of the pacing database;
determining a second current time;
comparing the second current time with the removal time of the selected entry; and
if the second current time is greater than or equal to the removal time of the selected entry selected, removing the server associated with the selected entry from pacing state.

26. The method of claim 19 wherein determining the server pacing period for the server comprises:
receiving server allocation information from the server allocator;
determining a period index based on the server allocation information;
looking up a period select in a server pacing configuration data module using the period index; and
determining the server pacing period for the server associated with the server allocation information, the determining based on the period select.

27. The method of claim 20 wherein performing the comparison of the first value based on the removal trigger time of the read entry with the second value based on time information from the time source comprises:
selecting one entry amongst a plurality of entries presented as output of the pacing database;
determining a second current time;
determining a removal time at which the allocated server may be removed from the pacing state by adding the second current time to the server pacing period of the server;
comparing a current time with the determined removal time; and if the second current time is greater than or equal to the removal time, removing the allocated server from pacing state.

28. The method of claim 21 wherein determining the server pacing period for the allocated server comprises:
    receiving server allocation information from a server allocator;
    determining a period index based on the server allocation information;
    looking up a period select in a server pacing configuration data module using the period index; and
    determining the server pacing period for the server associated with the server allocation information, the determining based on the period select.

29. The method of claim 23 wherein further comprising removing from the pacing database the selected entry from the pacing FIFO buffer from which the selected entry came and sending a notice of removal of the server associated with the selected entry from pacing state.

30. The method of claim 25 wherein removing the server associated with the entry from pacing state comprises removing the entry from the pacing FIFO buffer in the pacing database from which the entry came and sending a notice of removal of the server from connection pacing state.

31. The method of claim 29 wherein the notice of removal of the server associated with the selected entry from pacing state is sent to a server allocator.

32. The method of claim 29, wherein the notice of removal of the server associated with the selected entry from pacing state is sent to a server pacing status module.

33. The method of claim 30 wherein the notice of removal of the server from connection pacing state is sent to a server allocator.

34. The method of claim 30 wherein the notice of removal of the server from connection pacing state is sent to a server pacing status module.

35. A connection pacer to pace the establishment of connections in a network of servers and clients, comprising:
    controller means to receive from a server allocator server allocation information informing the controller means of an allocation of a server in the network performed by the server allocator, the allocated server to connect to a client in the network, the controller means further to send a first signal in response to receiving the server allocation information;
    a server pacing status module coupled to the controller means, the server pacing status module to store, in response to the first signal, connection pacing status information indicating that the allocated server is in a connection pacing state, wherein the allocated server is unavailable for any allocation to establish a network connection while in the connection pacing state;
    storage means to store connection pacing data for one or more servers in a pacing state, wherein the controller means is further to update the storage means in response to receiving the server allocation information, the updating including the storage means storing an entry for the allocated server, the entry having,
        an identifier of the allocated server, and
        a removal trigger time indicating a time when the allocated server can be removed from the connection pacing state,
    wherein the storage means is to present as output an entry that has been in the storage means the longest; and
    wherein the controller means is further to read the entry for the allocated server as the output of the storage means, the controller means further to perform a comparison of a first value based on the removal trigger time of the read entry with a second value based on time information from a time source, and wherein in response to the comparison, the controller means is further to signal the server pacing status module to remove the allocated server from the connection pacing state, the removing including storing connection pacing status information indicating that the allocated server is available to establish a connection.

* * * * *

UNITED STATES PATENT AND TRADEMARK OFFICE
CERTIFICATE OF CORRECTION

PATENT NO.         : 7,660,894 B1                                              Page 1 of 1
APPLICATION NO.    : 10/412812
DATED              : February 9, 2010
INVENTOR(S)        : Susan E Carrie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1484 days.

Signed and Sealed this

Twenty-eighth Day of December, 2010

David J. Kappos
*Director of the United States Patent and Trademark Office*